United States Patent
Liang et al.

(10) Patent No.: US 11,021,654 B2
(45) Date of Patent: Jun. 1, 2021

(54) LIQUID CRYSTAL COMPOSITION

(71) Applicant: SHIJIAZHUANG CHENGZHI YONGHUA DISPLAY MATERIAL CO., LTD., Hebei (CN)

(72) Inventors: Zhian Liang, Hebei (CN); Guoliang Yun, Hebei (CN); Yujing Di, Hebei (CN); Zhe Shao, Hebei (CN); Sumin Kang, Hebei (CN); Dongmei Wang, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 92 days.

(21) Appl. No.: 16/285,553

(22) Filed: Feb. 26, 2019

(65) Prior Publication Data
US 2019/0292459 A1   Sep. 26, 2019

(30) Foreign Application Priority Data
Mar. 23, 2018   (CN) .......................... 201810245322.0

(51) Int. Cl.
G02F 1/1333 (2006.01)
C09K 19/44 (2006.01)
C09K 19/34 (2006.01)
C09K 19/32 (2006.01)
C09K 19/30 (2006.01)
C09K 19/12 (2006.01)

(52) U.S. Cl.
CPC .............. *C09K 19/44* (2013.01); *C09K 19/12* (2013.01); *C09K 19/3003* (2013.01); *C09K 19/3028* (2013.01); *C09K 19/3066* (2013.01); *C09K 19/3098* (2013.01); *C09K 19/322* (2013.01); *C09K 19/3405* (2013.01); *C09K 19/3491* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3025* (2013.01); *C09K 2019/3036* (2013.01); *C09K 2019/3408* (2013.01); *C09K 2019/3425* (2013.01)

(58) Field of Classification Search
CPC .... C09K 19/44; C09K 19/12; C09K 19/3003; C09K 19/3028; C09K 19/3066; C09K 19/3098; C09K 19/322; C09K 19/3405; C09K 19/3491; C09K 2019/122; C09K 2019/123; C09K 2019/3004; C09K 2019/3009; C09K 2019/301; C09K 2019/3016; C09K 2019/3021; C09K 2019/3025; C09K 2019/3036; C09K 2019/3408; C09K 2019/3425; G02F 1/1333
USPC ..................................................... 252/299.61
See application file for complete search history.

(56) References Cited

U.S. PATENT DOCUMENTS

2019/0292459 A1*   9/2019  Liang ................. C09K 19/3003

FOREIGN PATENT DOCUMENTS

CN            104628541       *   5/2015  ........... G02F 1/1333

\* cited by examiner

*Primary Examiner* — Geraldina Visconti
(74) *Attorney, Agent, or Firm* — Paratus Law Group, PLLC

(57) ABSTRACT

Disclosed is a liquid crystal composition comprising one or more compounds represented by formula I, one or more compounds represented by formula II, and one or more compounds represented by formula III:

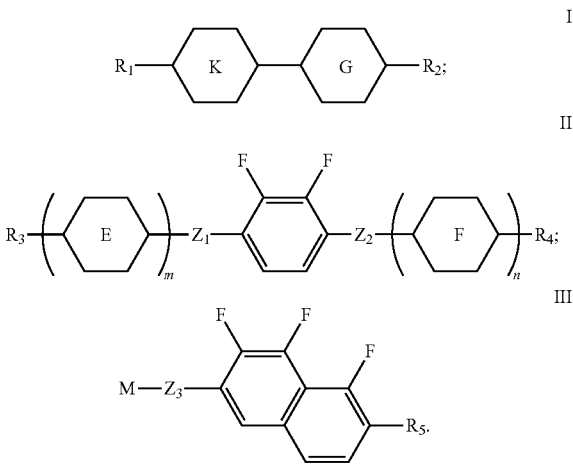

The liquid crystal composition has simultaneously a lower rotary viscosity, a better photoelectric performance, a higher clearing point, a good low temperature performance, and less display defects. Further disclosed is a liquid crystal display element or device comprising the liquid crystal composition.

16 Claims, No Drawings

LIQUID CRYSTAL COMPOSITION

CROSS REFERENCE TO PRIOR APPLICATION

This application claims priority to Chinese Patent Application No. 201810245322.0 (filed on Mar. 23, 2018), which is hereby incorporated by reference in its entirety.

TECHNICAL FIELD

The present invention relates to the field of liquid crystal displays. More particularly, the present invention relates to a liquid crystal composition, and a display element or liquid crystal display comprising the liquid crystal composition.

BACKGROUND ART

Thin film transistor liquid crystal displays (TFT-LCDs) have undergone a long period of basic research, and after realising large-scale production and commercialisation, thin film transistor liquid crystal displays have become mainstream products in LCD applications due to the advantages of light weight, being environmentally friendly, high performance, etc., thereof: the application of TFT-LCD can be seen everywhere whether in small-sized mobile phone screens, large-sized notebook PCs or monitors or in large-sized liquid crystal televisions (LCD-TV).

Early commercial TFT-LCD products basically relate to using a TN display mode, and the largest problem thereof is a narrow viewing angle. With the increase in product size, especially the application in the TV field, an IPS display mode and a VA display mode, which have the characteristic of a wide viewing angle, have been sequentially developed and applied; in particular, based on the improvement of the VA display mode, the breakthrough development thereof has been achieved successively in major companies, which mainly depends on the advantages of a wide viewing angle, a high contrast, no need for frictional alignment, etc., of the VA mode itself; furthermore, the contrast of the VA mode display is less dependent on the optical anisotropy ($\Delta n$) of the liquid crystal, the thickness of the liquid crystal cell (d) and the wavelength ($\lambda$) of the incident light, which will necessarily make the VA mode become a very promising display technique.

However, the liquid crystal medium used in an active matrix addressing mode display element for the VA mode, etc., itself is not perfect; the defects, for example, the residual image level is significantly worse than that of a positive dielectric anisotropic display element, the response time is relatively slow, and the driving voltage is higher. At this point, some new types of VA display techniques have quietly emerged: for example, a PSVA technique realises a wide viewing angle display mode similar to that of MVA/PVA, and also simplifies a CF process, such that the aperture ratio is increased while lowering the CF cost; furthermore, a higher brightness is obtained, thereby obtaining a higher contrast. In addition, since the liquid crystal of the entire panel has a pretilt angle, there is no domino delay phenomenon, a faster response time can also be obtained while maintaining the same drive voltage, and the residual image level will also not be affected; however, due to Fine Slit densely distributed electrodes in pixels, if the electrode width cannot be evenly distributed, the problem of uneven display can easily occur. Like a UVVA technique, on the basis of keeping the advantages of the PSVA technique, since there is no Slit structure on the TFT side, the problem of display unevenness caused by uneven pixel electrode width is also improved.

Although display devices are continuously developing, efforts are still being made to study new liquid crystal compositions to enable an inter-coordination between the properties, such as the rotary viscosity, clearing point, low temperature stability, control of display defects, refractive index, and particularly response speed, of liquid crystal media and display devices to which these crystal media are applied and to improve various display defects.

SUMMARY OF THE INVENTION

A first object of the present invention is to provide a liquid crystal composition which has simultaneously a lower rotary viscosity, a better photoelectric performance, a higher clearing point, a good low temperature performance, and less display defects.

A second object of the present invention is to provide a liquid crystal display element or device comprising the liquid crystal composition.

In order to achieve the first object mentioned above, the following technical solution is used in the present invention:

a liquid crystal composition comprising one or more compounds represented by formula I, one or more compounds represented by formula II, and one or more compounds represented by formula III:

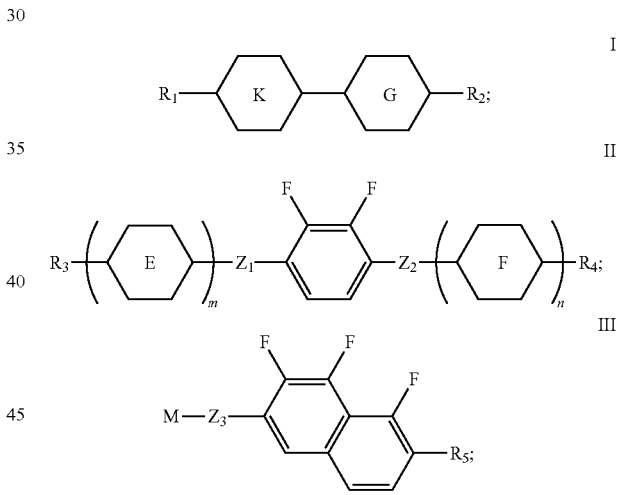

wherein $R_1$, $R_2$, $R_3$, $R_4$ and $R_5$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more unconnected $CH_2$ in the groups represented by $R_3$, $R_4$ and $R_5$ can be substituted with cyclopentyl, cyclobutyl or cyclopropyl;

$Z_1$ and $Z_2$ each independently represent a single bond, $-CH_2CH_2-$ or $-CH_2O-$;

$Z_3$ represents one of a single bond, $-CH_2CH_2-$, $-CH_2O-$, $-CH_2-$, and $-COO-$;

M represents one of cyclopentyl, cyclopropyl, cyclobutyl and cycloheptyl;

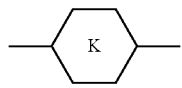

represents 1,4-phenylene or 1,4-cyclohexylene;

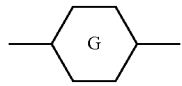

represents 1,4-phenylene or 1,4-cyclohexylene;

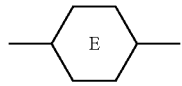

represents one of 1,4-phenylene, 1,4-cyclohexylene, a fluorine-substituted 1,4-phenylene and 1,4-cyclohexenylene;

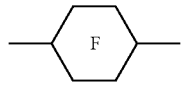

represents one of 1,4-phenylene, 1,4-cyclohexylene, a fluorine-substituted 1,4-phenylene and 1,4-cyclohexenylene; and m and n each independently represent 0, 1 or 2.

Preferably, said one or more compounds represented by formula I are one or more compounds represented by formulae I-1 to I-17 below:

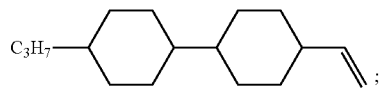
I-1

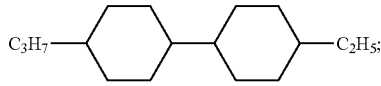
I-2

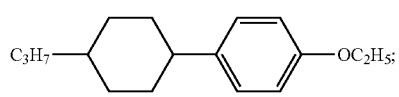
I-3

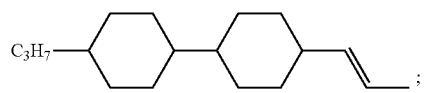
I-4

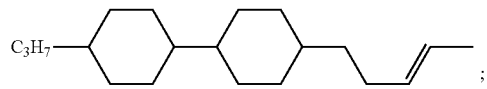
I-5

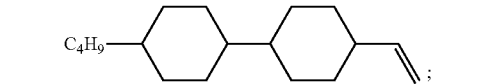
I-6

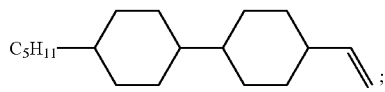
I-7

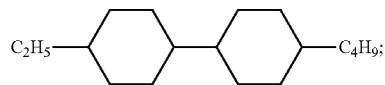
I-8

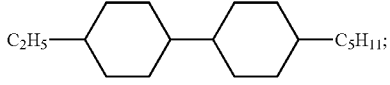
I-9

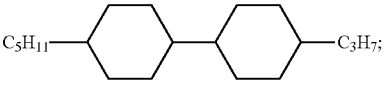
I-10

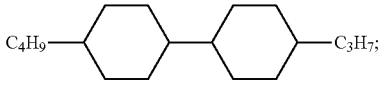
I-11

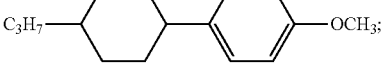
I-12

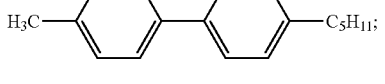
I-13

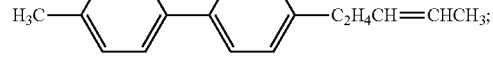
I-14

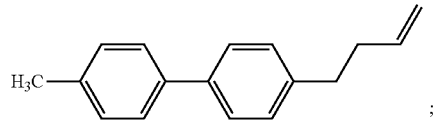
I-15

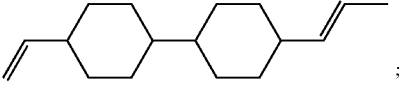
I-16

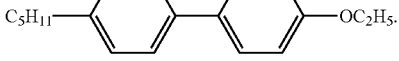
I-17

The compound represented by formula I above has a larger negative dielectric anisotropy, up to −10 or more, and a low rotary viscosity, and is used in a liquid crystal mixture to improve the dielectric anisotropy of the liquid crystal while reducing the rotary viscosity and lowering the threshold voltage.

Preferably, said one or more compounds represented by formula II are one or more compounds represented by formulae II-1 to II-13 below:

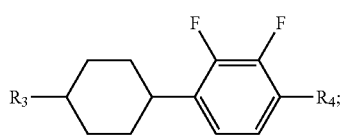
II-1

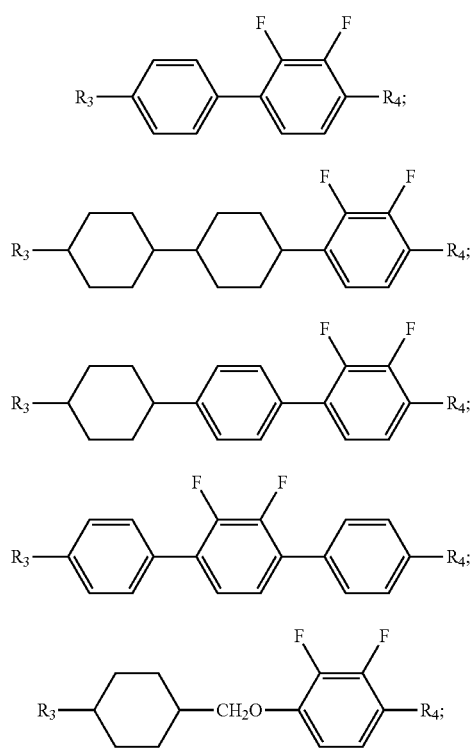

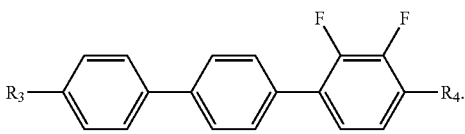

wherein

R$_3$ and R$_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more unconnected CH$_2$ in the groups represented by R$_3$ and R$_4$ can be substituted with cyclopentyl, cyclobutyl or cyclopropyl.

The compound represented by formula II above has a larger negative dielectric anisotropy, and is used in a liquid crystal mixture to mainly improve the dielectric anisotropy of the liquid crystal while lowering the threshold voltage.

Preferably, said one or more compounds represented by formula III are one or more compounds represented by formulae III-1 to III-8 below:

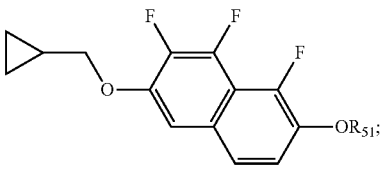

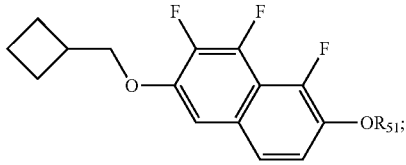

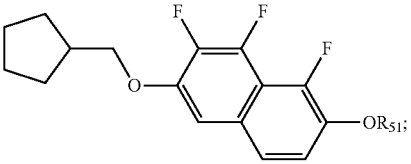

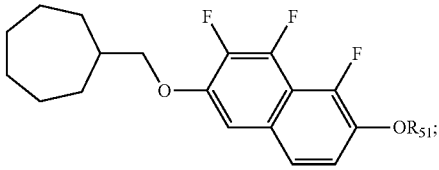

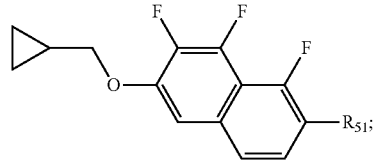

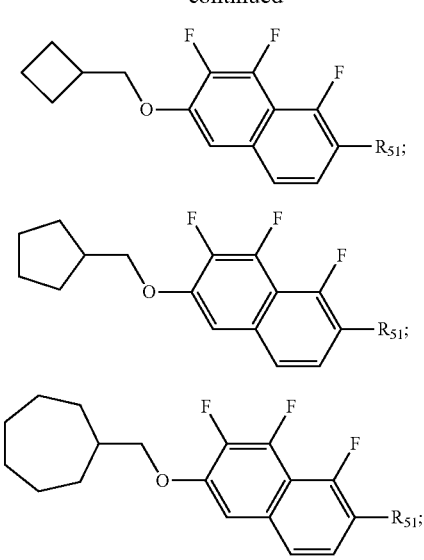

III-6

III-7

III-8 wherein $R_{51}$ represents an alkyl group having a carbon atom number of 1-10.

The compound represented by formula III has a larger negative dielectric anisotropy, up to −10 or more, and a low rotary viscosity, and is used in a liquid crystal mixture to improve the dielectric anisotropy of the liquid crystal while reducing the rotary viscosity and lowering the threshold voltage.

Preferably, in said liquid crystal composition, the total mass content of the compounds represented by formula I is 10-70%, the total mass content of the compounds represented by formula II is 10-70%, and the total mass content of the compounds represented by formula III is 1-20%. Among them, the compound represented by formula II has a higher viscosity, and where the amount of the compound added represents 10%-60% by mass of the total mass of the liquid crystal composition, the viscosity of the composition system is well prevented from being too high.

Preferably, said liquid crystal composition is a negative liquid crystal composition, and further comprises one or more compounds represented by formula IV:

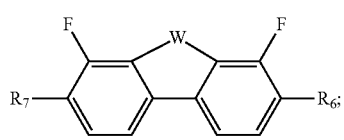

IV wherein $R_6$ and $R_7$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more unconnected $CH_2$ in the groups represented by $R_5$ and $R_6$ can be substituted with cyclopentyl, cyclobutyl or cyclopropyl; and W represents O, S or —$CH_2O$—.

More preferably, the compound represented by formula IV is one selected from formulae IV-1 to IV-9 below:

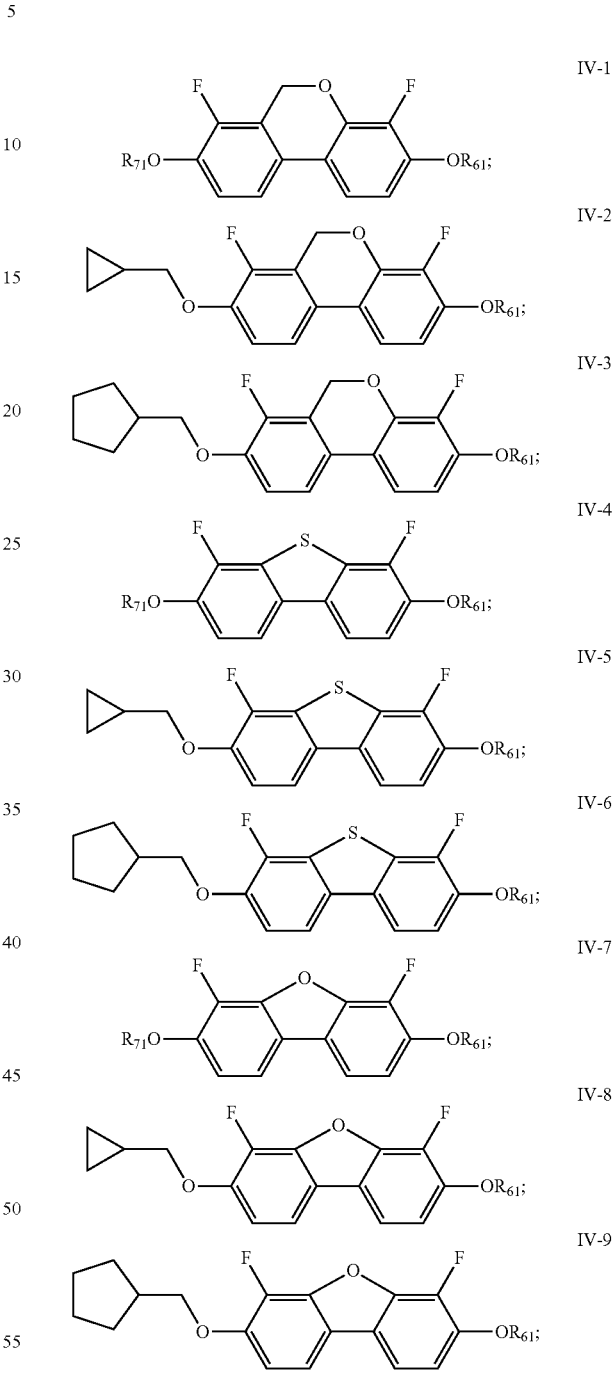

wherein $R_{61}$ and $R_{71}$ each independently represent an alkyl group having a carbon atom number of 1-10.

The compound represented by formula IV mentioned above has a larger negative dielectric anisotropy, which is advantageous for reducing the drive voltage of a device.

Preferably, said liquid crystal composition is a negative liquid crystal composition, and further comprises one or more compounds represented by formula V:

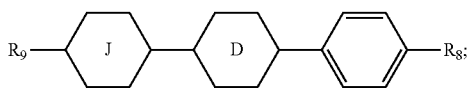

V wherein $R_8$ and $R_9$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more unconnected $CH_2$ in the groups represented by $R_8$ and $R_9$ can be substituted with cyclopropyl; and

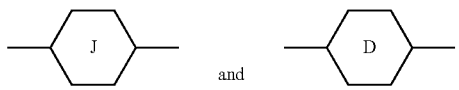

each independently represent 1,4-phenylene, a fluorine-substituted 1,4-phenylene, 1,4-cyclohexylene or 1,4-cyclohexenylene.

More preferably, the compound represented by formula V is one selected from formulae V-1 to V-7 below:

V-1

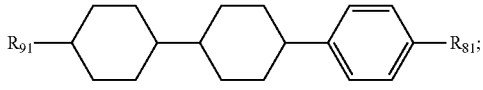

V-2

V-3

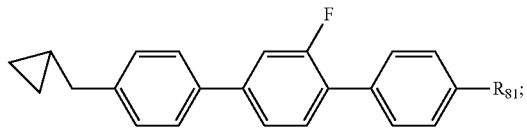

V-4

V-5

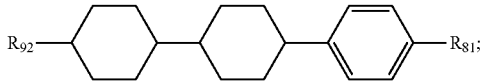

V-6

V-7 wherein $R_{81}$ represents an alkyl group having a carbon atom number of 1-6; $R_{82}$ represents an alkoxy group having a carbon atom number of 1-6; $R_{91}$ represents an alkyl group having a carbon atom number of 2-6; and $R_{92}$ represents an alkenyl group having a carbon atom number of 2-6.

The compound represented by formula V mentioned above has a high clearing point and a lower viscosity, which is advantageous for increasing the operating temperature range of the liquid crystal.

Where the terminal chain of the compound represented by formula V mentioned above is an alkenyl group $R_{92}$, the liquid crystal has a higher clearing point and elastic constant, especially $K_{33}$, which is advantageous for improving the parameter performance of the liquid crystal.

Preferably, said liquid crystal composition is a negative liquid crystal composition, and further comprises one or more compounds represented by formula VI:

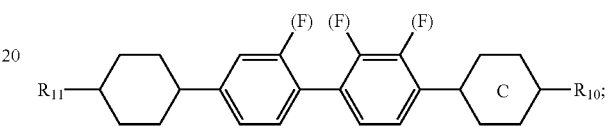

VI wherein $R_{11}$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; and

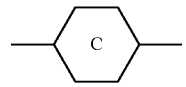

represents 1,4-phenylene, 1,4-cyclohexylene or 1,4-cyclohexenylene.

It needs to be noted that in formula VI mentioned above, the three (F)s in the structure may each independently represent H or F.

More preferably, the compound represented by formula VI is one selected from formulae VI-1 to VI-4 below:

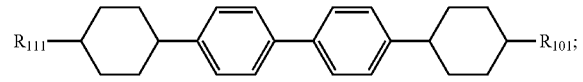

VI-1

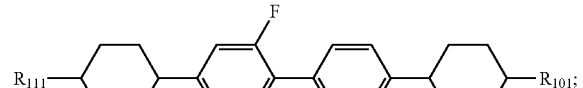

VI-2

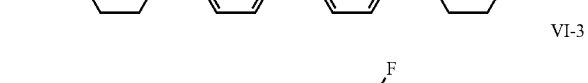

VI-3

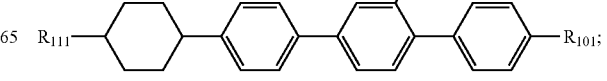

-continued

VI-4

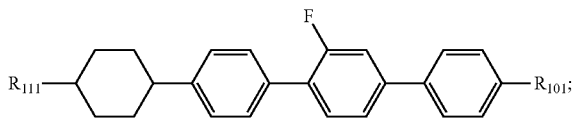

wherein

R$_{101}$ and R$_{111}$ each independently represent an alkyl group having a carbon atom number of 1-6.

Preferably, various functional dopants may be further added to the liquid crystal compound provided by the present invention, and the content of the dopant is preferably between 0.01 wt % and 1 wt %. More preferably, said dopant is primarily an antioxidant, a light stabilizer, etc.

Preferably, said antioxidant is one or more selected from those of the following structural formulae:

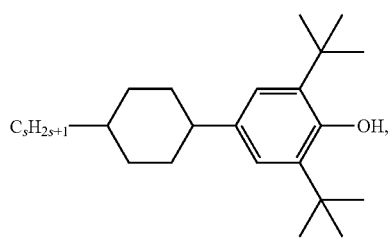

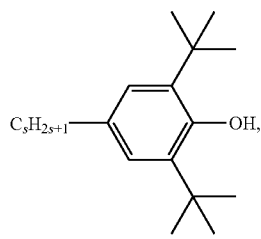

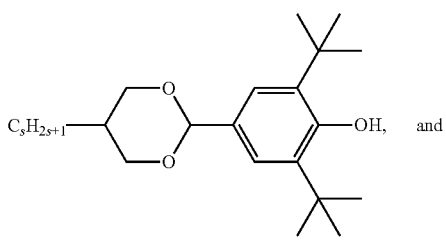 and

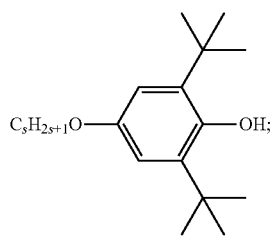

said light stabilizer is

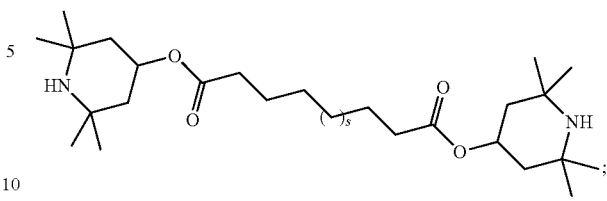

wherein S represents an integer of 1-10.

The present invention further claims a liquid crystal display element or device comprising the above-mentioned liquid crystal composition.

It is to be understood that said liquid crystal display element or device includes liquid crystal display elements and liquid crystal display devices. The liquid crystal display element may be an active matrix addressing liquid crystal display element or a passive matrix display element; and the liquid crystal display device may be an active matrix addressing liquid crystal display or a passive matrix display.

Preferably, said active matrix addressing liquid crystal display element is a VA-TFT or IPS-TFT liquid crystal display element.

Preferably, said active matrix addressing liquid crystal display element is a VA-TFT or IPS-TFT liquid crystal display element.

The present invention has the following beneficial effects:

The liquid crystal composition provided by the present invention has the advantages of a low viscosity, a fast response, a wide operating temperature range, less display defects, etc. It can be used well in a liquid crystal display element or device, and is especially suitable for small and medium size displays or IPS, VA, FFS liquid crystal compositions for TV applications.

DETAILED DESCRIPTION OF EMBODIMENTS

In order to more clearly illustrate the present invention, the present invention will be further described below in conjunction with preferred embodiments. A person skilled in the art should understand that the following contents described in detail are illustrative rather than limiting, and should not limit the scope of protection of the present invention.

In this description, unless otherwise specified, percentages are mass percentages, temperatures are in degree Celsius (° C.), and the specific meanings of the other symbols and the test conditions are as follows:

Cp represents the clearing point (° C.) of the liquid crystal measured by a DSC quantitative method;

S—N represents the melting point (° C.) for the transformation of a liquid crystal from a crystal state to a nematic phase;

$\Delta n$ represents the optical anisotropy, $n_o$ is the refractive index of an ordinary light, $n_e$ is the refractive index of an extraordinary light, with the test conditions being 25±2° C. and 589 nm, and an abbe refractometer for testing;

$\Delta\varepsilon$ represents the dielectric anisotropy, $\Delta\varepsilon=\varepsilon_{//}-\varepsilon_{\perp}$, wherein $\varepsilon_{//}$ is a dielectric constant parallel to a molecular axis, and $\varepsilon_{\perp}$ is a dielectric constant perpendicular to the molecular axis, the test condition is 25±0.5° C., a 20 micron parallel cell is used, and INSTEC: ALCT-IR1 is used for the test;

γ1 represents a rotary viscosity (mPa·s), with the test condition being 25±0.5° C., a 20 micron parallel cell, and INSTEC: ALCT-IR1 for testing; and ρ represents an electrical resistivity (S-cm), with the test conditions being: 25±2° C., and the test instruments being a TOYO SR6517 high resistance instrument and an LE-21 liquid electrode.

VHR represents a voltage holding rate (%), with the test condition being 20±2° C., a voltage of ±5 V, a pulse width of 10 ms, and a voltage holding time of 16.7 ms. The test equipment is a TOYO Model 6254 liquid crystal performance comprehensive tester.

τ represents a response time (ms), with the test instrument being DMS-501 and the test conditions being: 25±0.5° C., a test cell that is a 3.3 micron IPS test cell, an electrode spacing and an electrode width, both of which are 10 microns, and an included angle between the frictional direction and the electrode of 10°.

In the embodiments of the present invention, liquid crystal monomer structures are represented by codes, wherein the codes of ring structures, end groups and linking groups of liquid crystals are represented, as shown in tables 1 and 2 below.

TABLE 1

Corresponding code for ring structure

| Ring structure | Corresponding code |
|---|---|
|  | C |
|  | P |
| 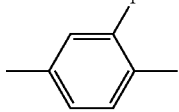 | G |
| 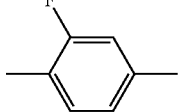 | Gi |
| 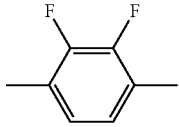 | Y |
| 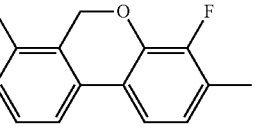 | Sa |
| 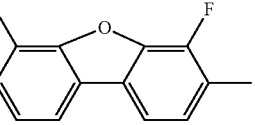 | Sb |

TABLE 1-continued

Corresponding code for ring structure

| Ring structure | Corresponding code |
|---|---|
| 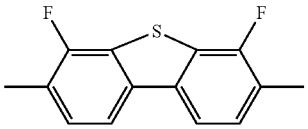 | Sc |
| 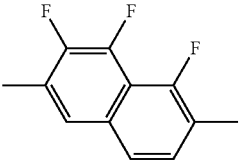 | W |

TABLE 2

Corresponding code for end group and linking group

| End group and linking group | Corresponding code |
|---|---|
| $C_nH_{2n+1}$— | n- |
| $C_nH_{2n+1}O$— | nO— |
| —$OCF_3$ | —OT |
| —$CF_2O$— | -Q- |
| —$CH_2O$— | —O— |
| —F | —F |
| —CN | —CN |
| —$CH_2CH_2$— | -E- |
| —CH=CH— | —V— |
| —COO— | —COO— |
| —CH=CH—$C_nH_{2n+1}$ | Vn- |
| 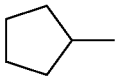 | C(5)- |
| 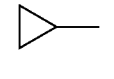 | C(3)- |
|  | C(3)1- |

EXAMPLES

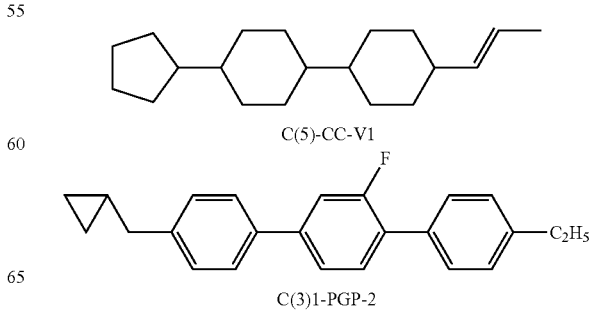

C(5)-CC-V1

C(3)1-PGP-2

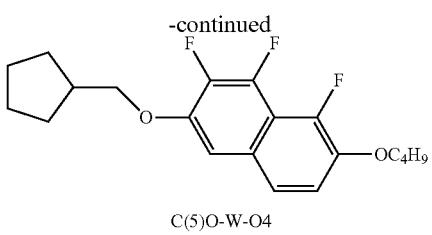

C(5)O-W-O4

In the embodiments of the present invention, the method for preparing the liquid crystal composition comprises: weighing various monomers at a designed ratio into a beaker, heating these monomers to a clearing point with stirring, holding the mixture for 30 minutes, cooling the mixture to room temperature, and testing various parameters under test conditions.

The following specific examples are used to illustrate the present invention.

Example 1

The formula of the liquid crystal composition and the corresponding properties thereof are as shown in table 3 below.

TABLE 3

Formula of the liquid crystal composition of Example 1 and the corresponding properties thereof

| Category | Liquid crystal monomer code | Content (%) |
|---|---|---|
| II | 5-CY-O4 | 11 |
| II | 5-PY-O2 | 9 |
| II | 5-COY-O2 | 12 |
| II | 3-CCOY-O2 | 3 |
| II | 5-CCY-O2 | 10 |
| II | 3-CPY-O2 | 10 |
| I | 3-CC-2 | 10 |
| I | 3-CC-V | 20 |
| I | 1-PP-2V | 5 |
| III | C(5)O-W-O4 | 10 |

Cp: 55    $\gamma_1$: 80
$\Delta n$: 0.0948    $\Delta \varepsilon$: −4.6

Comparative Example 1

The 10% of the compound of formula III, i.e., C(5)O—W—O4, in Example 1 is replaced by

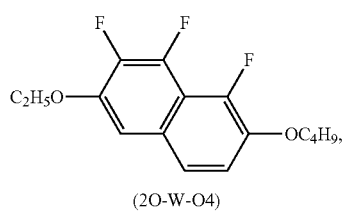

(2O-W-O4)

which is an existing similar compound, to give a mixture of Comparative Example 1 with a clearing point CP reduced to 53° C. and a $\Delta \varepsilon$ increased to −4.4.

Comparative Example 2

The 10% of the compound of formula III, i.e., C(5)O—W—O4, in Example 1 is replaced by

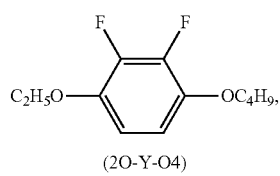

(2O-Y-O4)

which is an existing similar compound, to give a mixture of Comparative Example 1 with a clearing point CP reduced to 50° C. and a $\Delta \varepsilon$ increased to −4.2.

Example 2

The formula of the liquid crystal composition and the corresponding properties thereof are as shown in table 4 below.

TABLE 4

Formula of the liquid crystal composition of Example 1 and the corresponding properties thereof

| Category | Liquid crystal monomer code | Content (%) |
|---|---|---|
| II | 5-CY-O4 | 11 |
| II | 5-CLY-O2 | 9 |
| II | 3-COY-O2 | 12 |
| II | 3-CCOY-O2 | 12 |
| II | 5-CCY-O2 | 16 |
| II | 3-CPY-O2 | 10 |
| I | 3-CC-2 | 10 |
| I | 3-CC-V | 5 |
| I | 1-PP-2V | 5 |
| IV | C(5)O-Sc-O4 | 4 |
| III | C(5)O-W-O4 | 6 |

Cp: 81    $\gamma_1$: 155
$\Delta n$: 0.106    $\Delta \varepsilon$: −5.8

Example 3

The formula of the liquid crystal composition and the corresponding properties thereof are as shown in table 5 below.

TABLE 5

Formula of the liquid crystal composition of Example 1 and the corresponding properties thereof

| Category | Liquid crystal monomer code | Content (%) |
|---|---|---|
| II | 5-CY-O4 | 3 |
| II | 5-CLY-O2 | 2 |
| II | 3-COY-O2 | 2 |
| II | 3-CCOY-O2 | 3 |
| II | 5-CCY-O2 | 5 |
| II | 3-CPY-O2 | 5 |
| I | 3-CC-2 | 10 |
| I | 3-CC-V | 30 |
| I | 1-PP-5 | 10 |
| IV | C(5)O-Sb-O4 | 5 |
| V | 3-CPP-2V1 | 5 |
| V | 3-CCP-1 | 5 |
| III | C(5)O-W-O4 | 15 |

Cp: 60    $\gamma_1$: 75
$\Delta n$: 0.101    $\Delta \varepsilon$: −3.4

Example 4

The formula of the liquid crystal composition and the corresponding properties thereof are as shown in table 6 below.

TABLE 6

Formula of the liquid crystal composition of Example 1 and the corresponding properties thereof

| Category | Liquid crystal monomer code | Content (%) |
|---|---|---|
| II | 5-CY-O4 | 6 |
| II | 5-PY-O2 | 9 |
| II | 3-COY-O2 | 2 |
| II | 3-CCOY-O2 | 3 |
| II | 5-CCY-O2 | 10 |
| II | 3-CPY-O2 | 10 |
| I | 3-CC-2 | 10 |
| I | 3-CC-V | 25 |
| I | O2-PP-5 | 5 |
| IV | C(5)O-Sa-O4 | 5 |
| V | 3-CPP-2 | 8 |
| V | 3-CCP-O1 | 5 |
| III | C(5)O-W-O4 | 2 |

Cp: 75  $\gamma_1$: 90
$\Delta n$: 0.104  $\Delta\varepsilon$: −3.1

Example 5

The formula of the liquid crystal composition and the corresponding properties thereof are as shown in table 7 below.

TABLE 7

Formula of the liquid crystal composition of Example 1 and the corresponding properties thereof

| Category | Liquid crystal monomer code | Content (%) |
|---|---|---|
| II | 5-CY-O4 | 5 |
| II | 5-PY-O2 | 5 |
| II | 3-COY-O2 | 5 |
| II | 3-CCOY-O2 | 5 |
| II | 5-CCY-O2 | 10 |
| II | 3-CPY-O2 | 10 |
| I | 3-CP-O2 | 10 |
| I | 3-CC-V | 25 |
| I | 1-PP-2V | 5 |
| IV | C(5)O-Sb-O4 | 5 |
| V | 1V-CPP-2 | 5 |
| V | 3-CCP-O1 | 5 |
| III | C(5)O-W-O4 | 5 |

Cp: 75  $\gamma_1$: 98
$\Delta n$: 0.106  $\Delta\varepsilon$: −3.6

Example 6

The formula of the liquid crystal composition and the corresponding properties thereof are as shown in table 8 below.

TABLE 8

Formula of the liquid crystal composition of Example 1 and the corresponding properties thereof

| Category | Liquid crystal monomer code | Content (%) |
|---|---|---|
| II | 5-CY-O4 | 10 |
| II | 5-PY-O2 | 5 |
| II | 3-COY-O2 | 2 |
| II | 3-CCOY-O2 | 3 |
| II | 5-CCY-O2 | 10 |
| II | 3-CPY-O2 | 10 |
| I | 3-CC-V1 | 10 |
| I | 3-CC-V | 20 |
| I | 1-PP-5 | 6 |
| IV | C(5)O-Sb-O4 | 4 |
| V | 1V-CPP-2 | 5 |
| V | C(3)1-PGP-2 | 5 |
| III | C(5)O-W-O4 | 10 |

Cp: 71  $\gamma_1$: 105
$\Delta n$: 0.116  $\Delta\varepsilon$: −3.8

Example 7

The formula of the liquid crystal composition and the corresponding properties thereof are as shown in table 9 below.

TABLE 9

Formula of the liquid crystal composition of Example 1 and the corresponding properties thereof

| Category | Liquid crystal monomer code | Content (%) |
|---|---|---|
| II | 5-CY-O4 | 5 |
| II | 5-CLY-O2 | 5 |
| II | 3-COY-O2 | 12 |
| II | 3-CCOY-O2 | 3 |
| II | 5-CCY-O2 | 10 |
| II | 5-PPY-O2 | 10 |
| I | 3-CP-O2 | 5 |
| I | 3-CC-5 | 20 |
| I | 1-PP-2V | 5 |
| IV | C(5)O-Sa-O4 | 5 |
| V | 3-CPP-2V1 | 5 |
| V | C(3)1-PGP-2 | 5 |
| III | C(3)O-W-O4 | 8 |
| VI | 2-CPPC-3 | 2 |

Cp: 88  $\gamma_1$: 130
$\Delta n$: 0.125  $\Delta\varepsilon$: −4.3

Example 8

The formula of the liquid crystal composition and the corresponding properties thereof are as shown in table 10 below.

TABLE 10

Formula of the liquid crystal composition of Example 1 and the corresponding properties thereof

| Category | Liquid crystal monomer code | Content (%) |
|---|---|---|
| II | 5-CY-O4 | 10 |
| II | 5-PY-O2 | 5 |
| II | 3-COY-O2 | 2 |
| II | 3-CCOY-O2 | 3 |
| II | 5-CCY-O2 | 10 |
| II | 3-CPY-O2 | 10 |
| I | 3-CC-V1 | 10 |
| I | 3-CC-V | 20 |

TABLE 10-continued

Formula of the liquid crystal composition of Example 1 and the corresponding properties thereof

| Category | Liquid crystal monomer code | Content (%) |
|---|---|---|
| I | 1-PP-5 | 6 |
| IV | C(5)O-Sb-O4 | 4 |
| V | 1V-CPP-2 | 5 |
| V | C(3)1-PYP-2 | 5 |
| III | C(5)O-W-O4 | 10 |

Cp: 70 γ$_1$: −110
Δn: 0.115 Δε: −4.0

As can be seen from the above examples, the liquid crystal mixture of the present invention has a larger dielectric anisotropy, a higher clearing point, a moderate refractive index, and a lower rotary viscosity, and is very suitable for liquid crystal display devices in IPS and VA modes.

Obviously, the above-mentioned examples of the present invention are merely examples for clearly illustrating the present invention, rather than limiting the embodiments of the present invention; for a person of ordinary skill in the art, on the basis of the above description, other variations or changes in different forms may also be made, all the embodiments cannot be provided exhaustively herein, and any obvious variation or change derived from the technical solution of the present invention is still within the scope of protection of the present invention.

The invention claimed is:

1. A liquid crystal composition, characterized by comprising one or more compounds represented by formula I, one or more compounds represented by formula II, and one or more compounds represented by formula III:

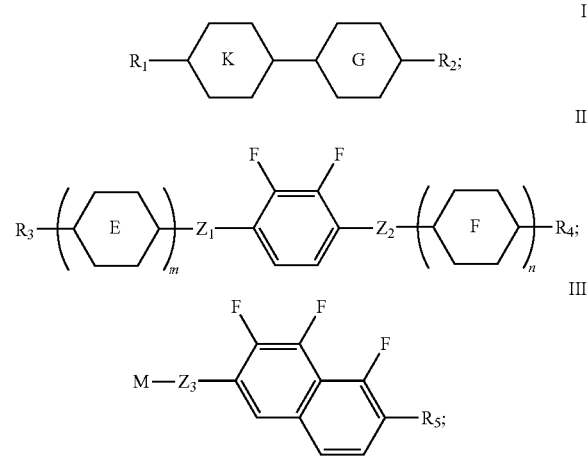

wherein
$R_1$, $R_2$, $R_3$, $R_4$ and $R_5$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more H in a CH$_2$ in the groups represented by $R_3$, $R_4$ and $R_5$ may be substituted with cyclopentyl, cyclobutyl, or cyclopropyl, wherein when more than one CH$_2$ in the groups represented by $R_3$, $R_4$ and $R_5$ comprise an H substituted with cyclopentyl, cyclobutyl, or cyclopropyl, such substituted CH$_2$ groups are non-consecutive;

$Z_1$ and $Z_2$ each independently represent a single bond, —CH$_2$CH$_2$— or —CH$_2$O—;

$Z_3$ represents one of a single bond, —CH$_2$CH$_2$—, —CH$_2$O—, —CH$_2$—, and —COO—;

M represents one of cyclopentyl, cyclopropyl, cyclobutyl and cycloheptyl;

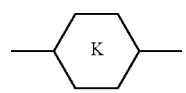

represents 1,4-phenylene or 1,4-cyclohexylene;

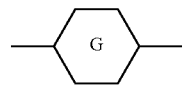

represents 1,4-phenylene or 1,4-cyclohexylene;

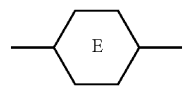

represents one of 1,4-phenylene, 1,4-cyclohexylene, a fluorine-substituted 1,4-phenylene and 1,4-cyclohexenylene;

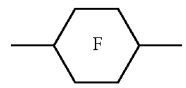

represents one of 1,4-phenylene, 1,4-cyclohexylene, a fluorine-substituted 1,4-phenylene and 1,4-cyclohexenylene; and m and n each independently represent 0, 1 or 2,
characterized in that said liquid crystal composition is a negative liquid crystal composition, and further comprises one or more compounds represented by formula IV:

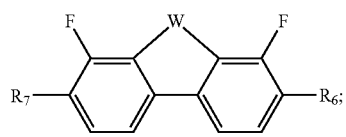

wherein
$R_6$ and $R_7$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more H in a $CH_2$ in the groups represented by $R_6$ and $R_7$ may be substituted with cyclopentyl, cyclobutyl, cyclopropyl, wherein when more than one $CH_2$ in the groups represented by $R_6$ and $R_7$ comprise an H substituted with cyclopentyl, cyclobutyl, or cyclopropyl, such substituted $CH_2$ groups are non-consecutive; and W represents O,S or —$CH_2$O—.

2. The liquid crystal composition according to claim 1, characterized in that said one or more compounds represented by formula I are one or more selected from compounds represented by formulae I-1 to I-17 below, said one or more compounds represented by formula II are one or more selected from compounds represented by formulae II-1 to II-13 below, and said one or more compounds represented by formula III are one or more selected from compounds represented by formulae III-1 to III-8 below:

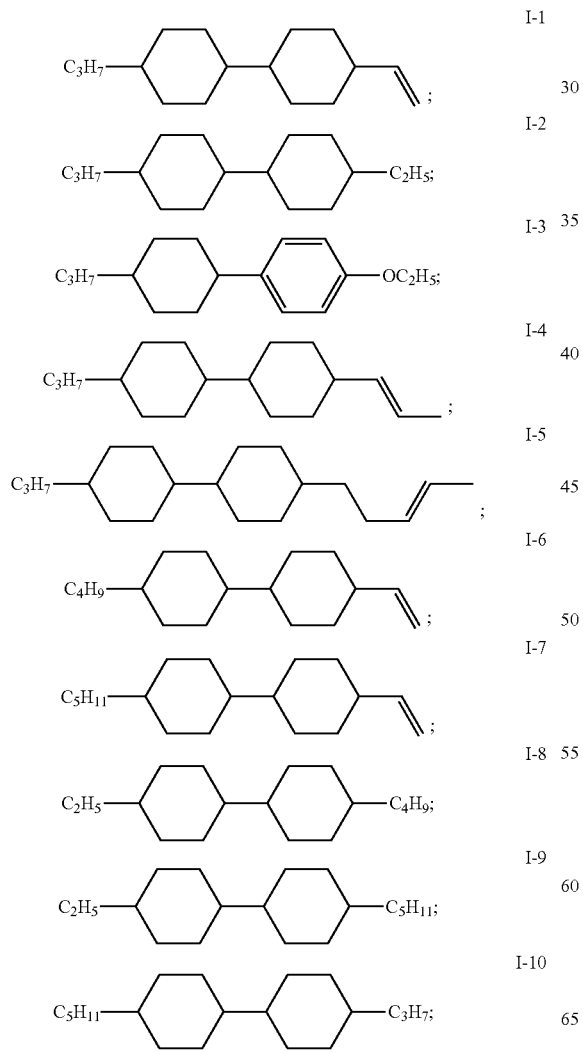
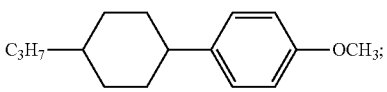
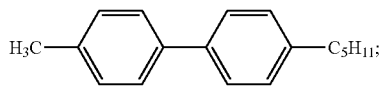
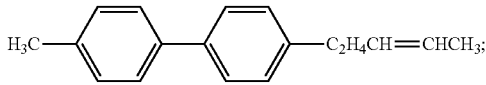
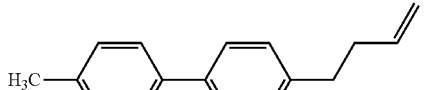
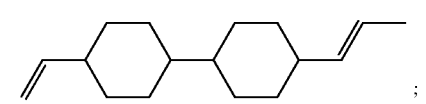
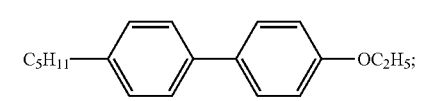
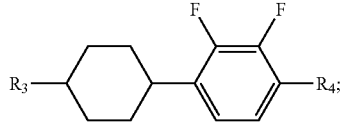
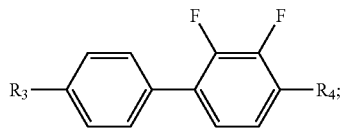
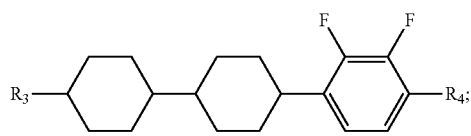
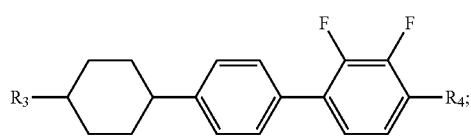
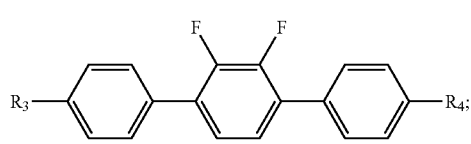
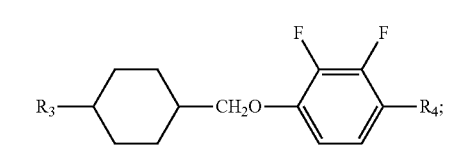

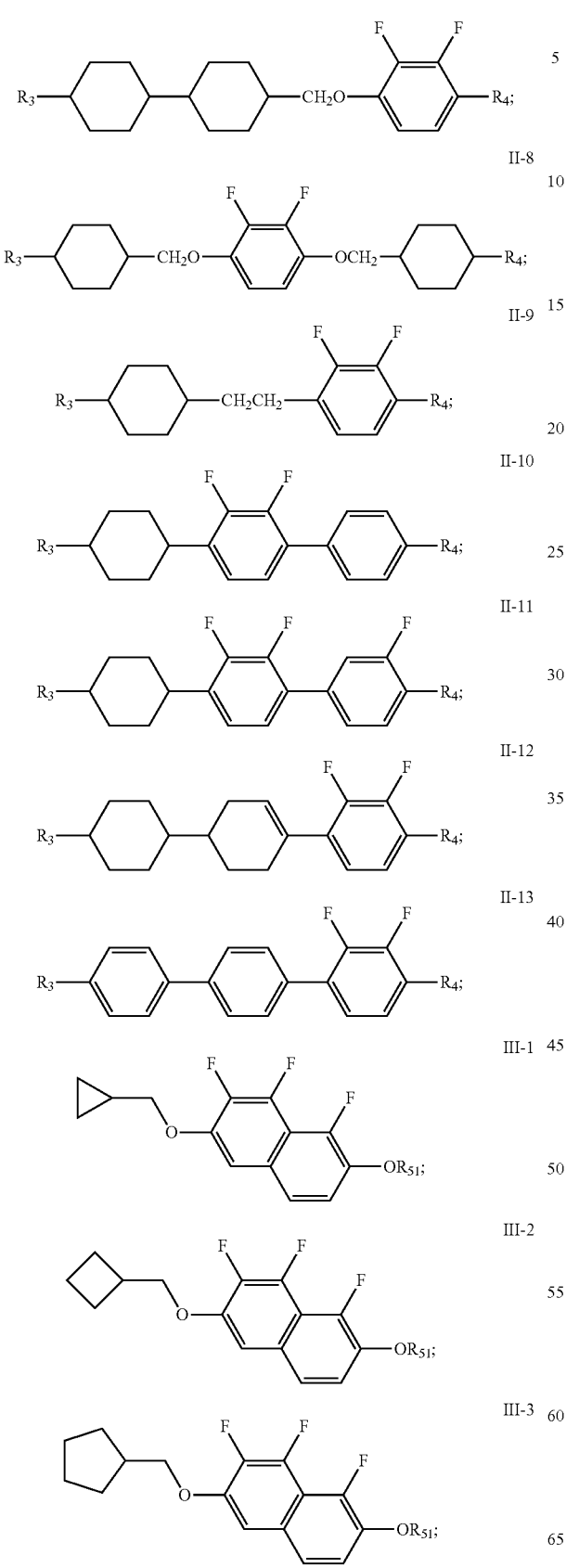
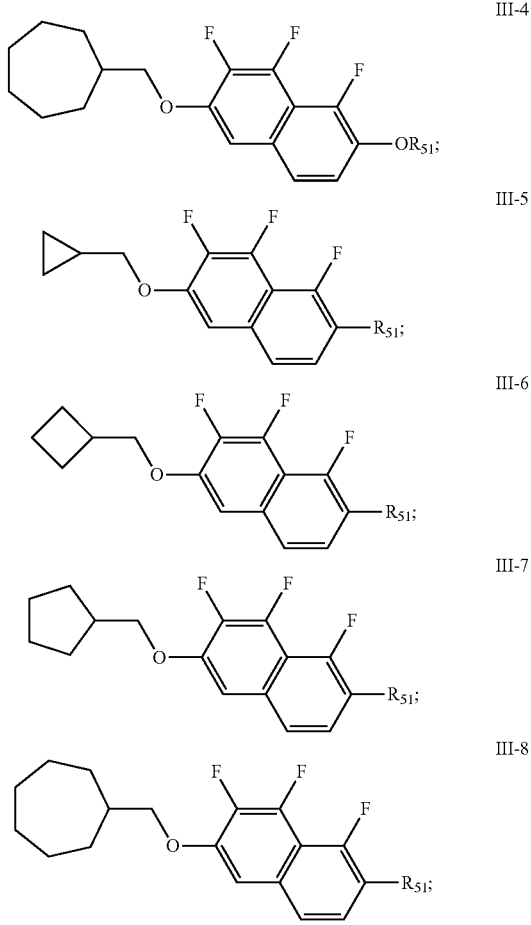

wherein

R$_3$ and R$_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more H in a CH$_2$ in the groups represented by R$_3$ and R$_4$ may be substituted with cyclopentyl, cyclobutyl, or cyclopropyl, wherein when more than one CH$_2$ in the groups represented by R$_3$ and R$_4$ comprise an H substituted with cyclopentyl, cyclobutyl or cyclopropyl, such substituted CH$_2$ groups are non-consecutive; and R$_{51}$ represents an alkyl group having a carbon atom number of 1-10.

3. The liquid crystal composition according to claim 1, characterized in that in said liquid crystal composition, the total mass content of the compounds represented by formula I is 10-70%, the total mass content of the compounds represented by formula II is 10-70%, and the total mass content of the compounds represented by formula III is 1-20%.

4. The liquid crystal composition according to claim 1, characterized in that said liquid crystal composition is a negative liquid crystal composition, and further comprises one or more compounds represented by formula V:

wherein $R_8$ and $R_9$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more H in a $CH_2$ in the groups represented by $R_8$ and $R_9$ may be substituted with cyclopropyl, wherein when more than one $CH_2$ in the groups represented by $R_8$ and $R_9$ comprise an H substituted with cyclopropyl, such substituted $CH_2$ groups are non-consecutive; and

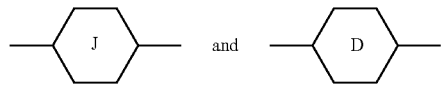

each independently represent 1,4-phenylene, a fluorine-substituted 1,4-phenylene, 1,4-cyclohexylene or 1,4-cyclohexenylene.

5. A liquid crystal composition, characterized by comprising one or more compounds represented by formula I, one or more compounds represented by formula II, and one or more compounds represented by formula III:

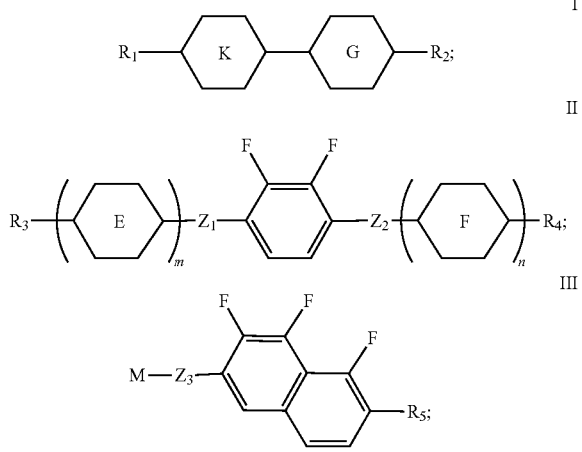

wherein $R_1$, $R_2$, $R_3$, $R_4$ and $R_5$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more H in a $CH_2$ in the groups represented by $R_3$, $R_4$ and $R_5$ may be substituted with cyclopentyl, cyclobutyl, or cyclopropyl, wherein when more than one $CH_2$ in the groups represented by $R_3$, $R_4$ and $R_5$ comprise an H substituted with cyclopentyl, cyclobutyl, or cyclopropyl, such substituted $CH_2$ groups are non-consecutive;

$Z_1$ and $Z_2$ each independently represent a single bond, —$CH_2CH_2$— or —$CH_2O$—;

$Z_3$ represents one of a single bond, —$CH_2CH_2$—, -$CH_2O$—, —$CH_2$—, and —COO—;

M represents one of cyclopentyl, cyclopropyl, cyclobutyl and cycloheptyl;

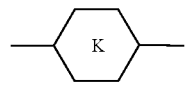

represents 1,4-phenylene or 1,4-cyclohexylene;

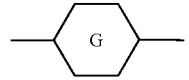

represents 1,4-phenylene or 1,4-cyclohexylene;

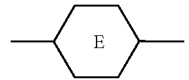

represents one of 1,4-phenylene, 1,4-cyclohexylene, a fluorine-substituted 1,4-phenylene and 1,4-cyclohexenylene;

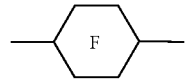

represents one of 1,4-phenylene, 1,4-cyclohexylene, a fluorine-substituted 1,4-phenylene and 1,4-cyclohexenylene; and m and n each independently represent 0, 1 or 2, characterized in that said liquid crystal composition is a negative liquid crystal composition, and further comprises one or more compounds represented by formula VI:

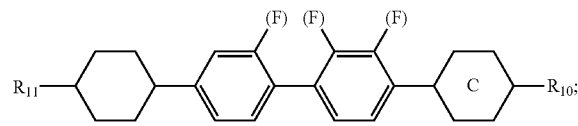

wherein
R₁₁ and R₁₀ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; and

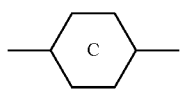

represents 1,4-phenylene, 1,4-cyclohexylene or 1,4-cyclohexenylene.

6. The liquid crystal composition according to claim 1, characterized in that the compound represented by formula IV is one selected from formulae IV-1 to IV-9 below:

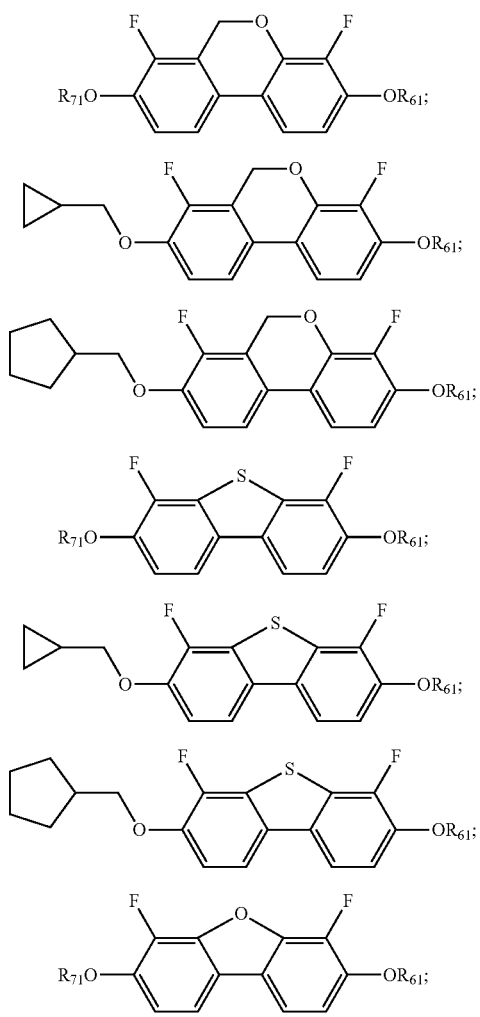

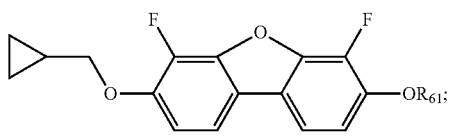

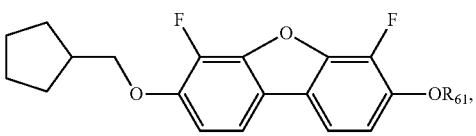

wherein
R₆₁ and R₇₁ each independently represent an alkyl group having a carbon atom number of 1-10.

7. The liquid crystal composition according to claim 4, characterized in that the compound represented by formula V is one selected from formulae V-1 to V-7 below:

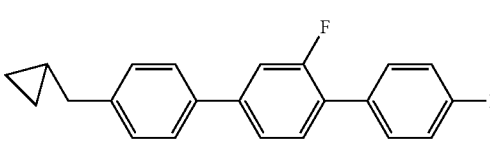

wherein
R₈₁ represents an alkyl group having a carbon atom number of 1-6; R₈₂ represents an alkoxy group having a carbon atom number of 1-6; R₉₁ represents an alkyl group having a carbon atom number of 2-6; and R₉₂ represents an alkenyl group having a carbon atom number of 2-6.

8. The liquid crystal composition according to claim 5, characterized in that the compound represented by formula VI is one selected from formulae VI-1 to VI-4 below:

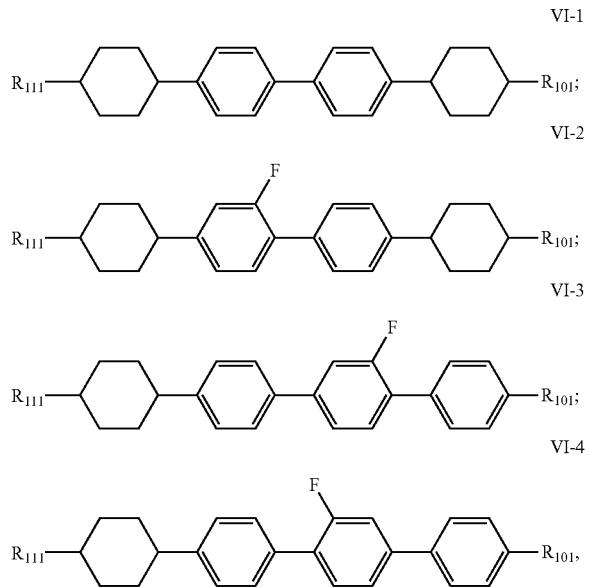

wherein

R$_{101}$ and R$_{111}$ each independently represent an alkyl group having a carbon atom number of 1-6.

9. A liquid crystal display element or device comprising the liquid crystal composition of claim 1.

10. A liquid crystal display element or device comprising the liquid crystal composition of claim 2.

11. A liquid crystal display element or device comprising the liquid crystal composition of claim 3.

12. A liquid crystal display element or device comprising the liquid crystal composition of claim 4.

13. A liquid crystal display element or device comprising the liquid crystal composition of claim 5.

14. A liquid crystal display element or device comprising the liquid crystal composition of claim 6.

15. A liquid crystal display element or device comprising the liquid crystal composition of claim 7.

16. A liquid crystal display element or device comprising the liquid crystal composition of claim 8.

* * * * *